Figure 1:
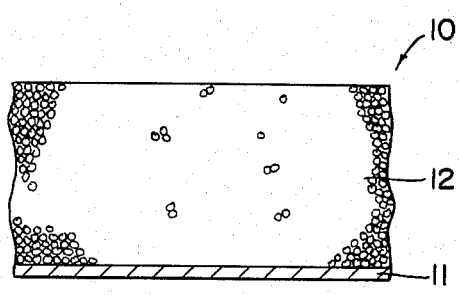
Figure 2:
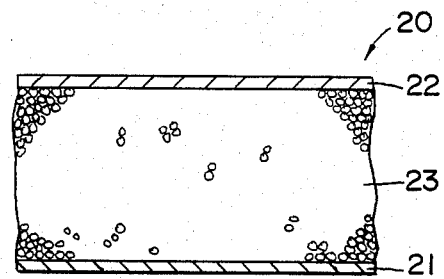

United States Patent [19]

Frentzel et al.

[11] Patent Number: 4,522,877

[45] Date of Patent: Jun. 11, 1985

[54] EXTRACTION OF POLYOXYALKYLENE SURFACTANTS FOR PHENOLIC FOAM STABILIZATION

[75] Inventors: Richard L. Frentzel; Ernest K. Moss, both of Clearwater, Fla.

[73] Assignee: The Celotex Corporation, Tampa, Fla.

[21] Appl. No.: 670,785

[22] Filed: Nov. 13, 1984

Related U.S. Application Data

[60] Division of Ser. No. 542,803, Oct. 17, 1983, , which is a division of Ser. No. 278,139, Jun. 29, 1981, Pat. No. 4,412,014, which is a continuation of Ser. No. 113,909, Jan. 21, 1980, abandoned.

[51] Int. Cl.$^3$ .............................................. B32B 3/26
[52] U.S. Cl. ................... 428/304.4; 428/314.4; 428/318.4; 521/94; 521/181
[58] Field of Search ............... 428/304.4, 314.4, 318.4; 521/181

[56] References Cited

U.S. PATENT DOCUMENTS

| | | | |
|---|---|---|---|
| 2,938,887 | 5/1960 | Weiss | 252/356 |
| 3,270,032 | 8/1966 | Erner | 260/326.5 E |
| 3,304,273 | 2/1967 | Stamberger | 521/88 |
| 3,383,351 | 5/1968 | Stamberger | 260/33.2 R |
| 3,385,834 | 5/1968 | Merijan | 252/356 |
| 3,523,093 | 8/1970 | Stamberger | 260/33.2 R |
| 3,746,663 | 7/1973 | Beale et al. | 521/137 |
| 3,914,188 | 10/1975 | Carroll et al. | 521/94 |
| 3,914,190 | 10/1975 | Carroll et al. | 521/94 |
| 4,091,030 | 5/1978 | Schwartz | 260/326.25 |
| 4,133,931 | 1/1979 | Beale et al. | 428/315 |
| 4,140,842 | 2/1979 | Beale et al. | 521/129 |
| 4,365,024 | 12/1982 | Frentzel | 521/115 |
| 4,412,014 | 10/1983 | Frentzel et al. | 521/129 |
| 4,418,158 | 11/1983 | Frentzel | 521/115 |
| 4,438,018 | 3/1984 | Frentzel | 521/136 |
| 4,481,307 | 11/1984 | Frentzel | 521/115 |
| 4,485,194 | 11/1984 | Frentzel et al. | 521/129 |

FOREIGN PATENT DOCUMENTS 1040452 8/1966 United Kingdom .................. 521/94

OTHER PUBLICATIONS

Kuryla et al., "Polymer/Polyols, A New Class of Polyurethane Intermediates," Journal of Cellular Plastics, pp. 84–96, 3/66.

Ravve: "Organic Chemistry of Macromolecules", p. 420, Marcel Dekker, Inc. 1967.

Ceresa: "Block and Graft Copolymerization," vol. 1, p. 20, John Wiley and Sons, 1973.

Primary Examiner—Morton Foelak
Attorney, Agent, or Firm—James W. Grace; Charles W. Vanecek

[57] ABSTRACT

Polyoxyalkylene foam stabilizing surfactants can be prepared by reacting a polyoxyalkylene adduct, a cyclic nitrogenous vinyl monomer and an esterified unsaturated dibasic acid under free radical polymerization conditions in the presence of a free radical initiator, and by subjecting the reaction product obtained to a solvent extraction. The isolated components can be utilized as surfactants in producing cellular foams.

17 Claims, 2 Drawing Figures

EXTRACTION OF POLYOXYALKYLENE SURFACTANTS FOR PHENOLIC FOAM STABILIZATION

This is a division of application Ser. No. 542,803, filed Oct. 17, 1983, which is a division of application Ser. No. 278,139, filed June 29, 1981, now U.S. Pat. No. 4,412,014, which is a continuation of application Ser. No. 113,909, filed Jan. 21, 1980, now abandoned.

BACKGROUND OF THE INVENTION

1. Field of the Invention

This invention relates to the preparation and isolation of novel surfactants and their utilization in producing cellular foam materials, particularly phenolic and isocyanurate foams. A polyoxyalkylene adduct, a cyclic nitrogenous vinyl monomer and an esterified unsaturated dibasic acid are reacted under free radical polymerization conditions in the presence of a free radical initiator and polyoxyalkylene foam stabilizing surfactants are separated from the reaction product by solvent extraction.

2. Description of the Prior Art

Phenolic polymers have been known for decades. More recently there has been increased interest in phenolic polymers which can be formed into cellular materials more commonly referred to as foams. These foams are produced by mixing reactants in the presence of a blowing agent. See, for example, Thomas et al. U.S. Pat. No. 2,744,875 (1956); Nelson Canadian Pat. No. 674,181 (1963); Dijkstra Canadian Pat. No. 684,388 (1964); Wissenfels et al. Canadian Pat. No. 866,876 (1971); United Kingdom Specification No. 598,642 (1948); Australian Pat. No. 128,508 (1945); and Modern Plastics Encyclopedia, Volumn 41, pages 362, 363 (1964). However, most known cellular materials produced from phenolic polymers exhibit an unsatisfactory thermal conductivity initially. Other known cellular materials produced from phenolic polymers exhibit an undesirable increase in thermal conductivity with time.

U.S. Pat. No. 4,140,842 (1979) discloses improved phenolic foam materials made with phenol:o-cresol resoles, which are characterized by high thermal resistance and a relatively slow increase in thermal conductivity with time. These foams are produced utilizing a cell stabilizing surfactant which is the capped reaction product of an alkoxylated amine and a copolymerizable mixture of dialkyl maleate and N-vinyl-2-pyrrolidinone or N-vinyl caprolactam. A disadvantage of these phenolic foams is that at higher phenol:o-cresol ratios, i.e., a deficiency of o-cresol, the cellular material produced tends to become coarse celled and too friable.

OBJECTS OF THE INVENTION

It is therefore an object of the present invention to provide a method of producing and isolating surfactants which are useful in preparing fine, closed-cell foam materials, especially phenolic foams, as well as a method of producing the foams by use of the surfactants.

It is another object of the present invention to provide improved cellular foam stabilizing surfactants resulting from the production and separation processes of the invention.

It is still another object of the present invention to provide improved surfactants for use in phenolic, isocyanurate, and urethane foams.

It is a further object of the present invention to provide an improved closed cell phenolic-resin foam material substantially free of the disadvantages of prior foams and an improved laminated building panel employing the foam material.

It is a still further object of the present invention to produce a closed cell phenolic-resin foam material with high thermal resistance and high insulation properties and relatively slow increase in thermal conductivity with time.

It is another object of the present invention to produce a phenolic-resin foam material which exhibits a high closed cell content without adversely affecting friability, compressive strength and the low flammability characteristics of the material.

It is yet another object of the present invention to provide a closed cell phenolic-resin foam material which can be used in building panels which are highly insulating, thermally resistant, low in friability, soundproof and self-supporting.

These and other objects and advantages of the present invention will become more apparent by reference to the following detailed description and drawings wherein:

FIG. I is a cross-sectional view of a laminated building panel having one facing sheet; and FIG. II is a cross-sectional view of a laminated building panel having two facing sheets.

DESCRIPTION OF THE INVENTION

The above objects have been achieved and the drawbacks of the prior art have been overcome by the development of an improved method of preparing and isolating surfactants for foam materials, particularly phenolic foams. The improved method of preparing the cellular foam stabilizers of the present invention comprises the steps of:

(1) reacting together under free radical addition polymerization conditions (a) a cyclic nitrogenous vinyl monomer and (b) an esterified unsaturated dibasic acid in the presence of a polyoxyalkylene adduct, the hydroxyl groups of the polyoxyalkylene adduct being optionally capped, whereby a reaction product is obtained which can be used as a surfactant in the formation of phenolic foams; and (2) separating from the step (1) reaction product by any known method a major component thereof whose capacity for stabilizing phenolic foams is greater than that of said step (1) reaction product.

More particularly, the improved method of preparing the cellular foam stabilizers of the present invention comprises:

(1) reacting together under conventional free radical addition polymerization conditions (a) a cyclic nitrogenous monomer having the formula

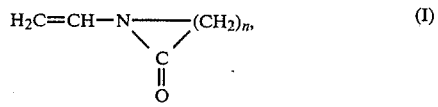

wherein n is 3, 4, or 5, and (b) an esterified unsaturated dibasic acid containing 4 or 5 carbon atoms in the acid portion in the presence of a polyoxyalkylene adduct, the hydroxyl groups of said polyoxyalkylene adduct being optionally capped, whereby a reaction product is obtained which can be used as a surfactant in the formation of phenolic foams, said step (1) reaction product comprising a major and a minor component, the capacity of said major component for stabilizing phenolic foams being greater than that of said total step (1) reaction product;

(2) extracting said step (1) reaction product with a selective solvent, said selective solvent having a greater solubility for one of said major and minor components than for the other, preferably for the minor component, to yield an extract comprising said selective solvent and the more soluble of said components and an insoluble residue comprising the other of said components; and (3) recovering said major component having an enhanced phenolic foam stabilizing capacity and said minor component from said residue and extract. An advantageous feature of the method of the invention is that the minor component of the above step (1) reaction product can function as a surfactant for isocyanurate foams.

The new and unexpected feature of the foregoing processing steps of the invention is that they yield a phenolic foam surfactant having significantly improved cell stabilizing efficiency. The initially obtained capped reaction product from the free-radical initiated copolymerization of the cyclic nitrogenous vinyl monomer, esterified unsaturated dibasic acid and polyoxyalkylene adduct—step (1) of the immediately preceding paragraph—is itself a cellular foam stabilizer. But this stabilizer has drawbacks, particularly where it is used in phenolic foams having a relatively high phenol content. Surprisingly, the major component of this reaction product, which is isolated in accordance with the process of the invention, displays a significant improvement in its ability to stabilize such phenolic foams. In addition, the minor component isolated in this process can be used as a foam stabilizer in isocyanurate foams.

The first step in the surfactant preparation of the present invention can be carried out as described in U.S. Pat. No. 4,140,842 for the production of its alkoxylated amine/dialkyl maleate/N-vinyl nitrogenous monomer surfactant. The teachings of this patent are incorporated herein by reference.

In the broadest aspects of the instant invention, the polymerization of the cyclic nitrogenous vinyl monomer and esterified unsaturated dibasic acid can be conducted in the presence of any conventional polyoxyalkylene adduct. The polyoxyalkylene adduct can be represented by the structural formula

, (II)

wherein R is an organic or inorganic radical and t is the number of polyoxyalkylene chains reacted onto the R backbone. Preferably, R is an organic radical selected from aromatic, aliphatic, cycloaliphatic, and heterocyclic radicals, and combinations of these, and t is an integer from 1 to 50, more preferably 1 to 8, most preferably 1 to 4. Included among the conventional polyoxyalkylene adducts which can be employed as starting materials are anionic, cationic, and nonionic type surfactants. These surfactants may be used either alone or in admixture with each other. Nonionic type surfactants are preferred.

Among the conventional polyoxyalkylene adducts which can be employed are the alkylene oxide adducts of:

(a) Mono- and polyhydroxyalkanes and mono- and polyhydroxycycloalkanes;
(b) Alkanolamines;
(c) Mono- and polyamines;
(d) Non-reducing sugars and sugar derivatives;
(e) Aromatic amine/phenol/aldehyde condensation products;
(f) Phosphorus and polyphosphorus acids;
(g) Mono- and polyhydric phenols;
(h) Amides;
(i) Organic carboxylic acids;
(j) Hydroxyl containing triglycerides;
(k) Polysiloxanes; and the like.

The adducts are prepared in known manner. Preferably, the alkylene oxides employed in the adduct formation have 2 to 4 carbon atoms, for example, ethylene oxide, 1,2-epoxypropane, the epoxybutanes, and mixtures thereof. Mixed propylene oxide-ethylene oxide adducts have proved especially useful. In the preparation of the latter adducts, the ethylene oxide and propylene oxide are advantageously reacted in the molar ratio of 10:90 to 90:10.

It has been found that the molecular weight and alkylene oxide content of the conventional polyoxyalkylene adducts can play an important role in determining the cell stabilizing capacity of the surfactants prepared in accordance with the present invention. More specifically, certain adducts have been found to require a minimum ethylene oxide content and molecular weight for more efficient cell stabilization. These requirements can vary for different polyoxyalkylene adducts and foam systems but it is possible to establish the satisfactory values for any given foam through routine experimentation.

Advantageously, the mono- and polyhydroxyalkanes and mono- and polyhydroxycycloalkanes to be alkoxylated for use in the present invention can have from 1 to 8 hydroxyl groups. Illustrative alcohols for alkoxylation include, among others, ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, 3,4-dihydroxycyclopentane, tetramethylolcyclohexanol, cyclohexanediol, fatty alcohols, high molecular weight polyoxyalkylene glycols, and the like.

Another useful class of polyoxyalkylene adducts which can be employed are the alkylene oxide adducts of alkanolamines. Illustrative alkanolamines include ethanolamine, diethanolamine, triethanolamine, triisopropanolamine, and tributanolamine.

Another useful class of polyoxyalkylene adducts which can be employed are the alkylene oxide adducts of mono- and polyamines. Mono- and polyamines suitable for reaction with alkylene oxides include, among others, methylamine, ethylamine, isopropylamine, butylamine, benzylamine, aniline, the toluidines, naphthylamines, ethylenediamine, diethylene triamine, triethylenetetramine, 4,4'-methylenedianiline, 1,3-butanediamine, 1,4-butanediamine, 1,2-, 1,3-, 1,4-, 1,5 and 1,6-hexanediamine, phenylenediamines, toluenediamine, naphthalenediamines, and the like.

A further class of polyoxyalkylene adducts which can be employed are the alkylene oxide adducts of the nonreducing sugars and the nonreducing sugar derivatives. Among the nonreducing sugars and sugar derivatives contemplated are sucrose, alkyl glycosides such as methyl glucoside, ethyl glucoside, and the like, glycol glycosides such as ethylene glycol glycoside, propylene glycol glycoside, glycerol glycoside, and the like.

A still further useful class of polyoxyalkylene adducts are the alkylene oxide adducts of mono- and polyhydric phenols, including mononuclear dihydroxy benzenes, higher alkyl phenols, and polyphenols. Among the phenols which can be used are found, for example, catechol, resorcinol, orcinol, nonylphenol, bisphenol A, bisphenol F, condensation products of phenol and formaldehyde, more particularly the novolac resins, condensation products of various phenolic compounds and acrolein, the simplest members of this class being the 1,2,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyoxyalkylene adducts are the alkylene oxide adducts of aromatic amine/-phenol/aldehyde condensation products. The condensation products are prepared by condensing an aromatic amine, for instance, aniline, toluidine, or the like, a phenol such as phenol, cresol, or the like, and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the adducts.

The alkylene oxide adducts of phosphorus and polyphosphorus acids are another useful class of polyoxyalkylene adducts. Phosphoric acid, phosphorous acid, the polyphosphoric acids such as tripolyphosphoric acid, the polymetaphosphoric acids, and the like are desirable for use in this connection.

Examples of commercially available polyoxyalkylene adducts for use in the present invention include Polyglycol 15-200 from Dow Chemical Company, Flo Mo 36 C and 5D from Sellers Chemical Corporation, ethoxylated sorbitan esters from Imperial Chemical Industries, and Pluronics from BASF Wyandotte Corporation.

Cyclic nitrogenous monomers which can be employed in the initial copolymerization of the present invention are N-vinyl-2-pyrrolidinone, N-vinyl-2-caprolactam and N-vinyl-2-piperidone, preferably N-vinyl-2-pyrrolidinone.

In an advantageous embodiment of the invention, the ester of the unsaturated dibasic acid used in accordance with this invention corresponds to the formula:

$$C_uH_{2u-2}(CO_2C_vH_{2v+1})_2, \qquad (III)$$

wherein u is 2 or 3 and v is an integer from 3 to 18, more preferably 3 to 6.

Typical examples of the esters that may be used include dibutyl fumarate, dibutyl maleate, dihexyl fumarate, diamyl methylenemalonate, dipropyl itaconate, dibutyl itaconate, dimethylamyl maleate, diisooctyl maleate, dipentyl maleate, dihexyl maleate, dioctyl maleate, and ditridecyl maleate, preferably dibutyl maleate.

The free radical initiated copolymerization of this invention can be conducted under known polymerization conditions, using, e.g., solution, bulk, emulsion, or suspension polymerization techniques. Bulk polymerization has been found especially useful.

The free radical initiator used in the copolymerization reactions may be any of the known free radical initiators, including for example, the peroxide type such as t-butyl perbenzoate, or the azo type such as azobisisobutyronitrile, or combinations of these types; with the provision that such free radical initiators are effective at the polymerization conditions, especially in the temperature range of from about 30° to about 140° C., and in the presence of the particular polyoxyalkylene adduct reacted.

Examples of peroxide initiators which may be employed are hydrogen peroxide, and organic peroxides and hydroperoxides, such as tertiary butyl perbenzoate, tertiary butyl hydroperoxide, cumene hydroperoxide, di-tertiary butyl peroxide, acetyl peroxide, benzoyl peroxide, lauroyl peroxide and 2,4-dichlorobenzoyl peroxide. By an azo type catalyst is meant a compound containing the azo linkage —N=N—, such as azobisisobutyronitrile.

The free radical copolymerization is advantageously carried out by mixing the reactants and initiator(s) at temperatures from about 30° to about 140° C. under an inert atmosphere such as that provided by nitrogen and like inert gases until polymerization is complete. Polymerization is continued until the monomers are consumed, as detected by conventional analytical methods, such as gel permeation chromatography. Polymerization times of 1 or more hours can be expected.

The initiator(s) can be added in a single batch at the beginning of the polymerization or can be added portionwise at intervals during the course of polymerization. The polyoxyalkylene adduct, cyclic nitrogenous vinyl monomer and esterified unsaturated dibasic acid can be brought together at the beginning of the polymerization or can be combined in increments as polymerization proceeds, such as by the gradual and simultaneous addition of each of the monomers to a resin kettle containing the adduct. It has been found disadvantageous to carry out a homopolymerization of the nitrogenous monomer to the adduct.

In a preferred embodiment of the invention, the cyclic nitrogenous vinyl monomer and unsaturated diester monomer together constitute between about 5 and 40, more preferably 15 and 25, weight percent of the copolymerization reaction mixture. The cyclic nitrogenous vinyl monomer and unsaturated diester together comprise about 20 weight percent of the copolymerization reaction mixture in a most advantageous and preferred embodiment of the invention. The preferred molar ratio of cyclic nitrogenous vinyl monomer to unsaturated diester in the reaction mixture is 1:1. The concentration of initiator(s) in the mixture is advantageously within the range of about 1 to 10 weight percent, preferably 2 to 5 weight percent, based on the total weight of monomers.

The molecular weight of the conventional polyoxyalkylene adduct to be copolymerized can vary over a wide range. However, if the molecular weight is too low, the foam prepared with the subsequently extracted copolymerization product will collapse. No comparable limitation has been found in the case of conventional polyoxyalkylene adducts of high molecular weights. The latter adducts can be utilized in the highest molecular weights currently available to yield fine-celled foams in accordance with the present invention. As previously indicated, the suitable molecular weight and alkylene oxide content for any particular adduct and foam system is readily determinable by those skilled in the art. In general, the starting material alkoxylated adduct will have a molecular weight above about 1000, and advantageously in the range of approximately 2000 to 12,000. The molecular weight can be determined from the equation:

$$M.W. = \frac{56.1 \times 1000 \times f}{OH}$$

where
M.W.=molecular weight of the polyoxyalkylene adduct
f=functionality, that is, average number of hydroxyl groups per molecule of polyoxyalkylene adduct
OH=hydroxyl number of the polyoxyalkylene adduct.

It is desirable that the conventional polyoxyalkylene adduct used in the present invention be treated with a suitable agent to cap its hydroxyl groups. Suitable capping agents are those organic compounds capable of reacting with compounds containing active hydrogen groups, such as hydroxyl groups, as determined by the Zerewitinoff method. The capping agents convert the hydroxyl groups of the polyoxyalkylene adduct to groups which are substantially chemically inert in the cellular foam-forming mixtures of the invention. The capping reaction takes place under conditions well known in the art; as, for example, described in Sandler, S. R. and Karow, "Organic Functional Group Preparations," Organic Chemistry, A Series of Monographs Edited by A. J. Blomquist, Academic Press, New York and London, 1968 Edition, Vol. III, pages 246–247, 1971 Edition, Vol. II, page 223 and 1972 Edition, Vol. III, page 13, the descriptions of which are incorporated herein by reference. The capping treatment may take place either before or after the copolymerization. Suitable capping agents include organic acids, acid anhydrides, acid chlorides, and acyloxy chlorides, such as a lower alkyl monocarboxylic acid having 1 to 10 carbon atoms selected from the group consisting of acetic acid, propionic acid, butyric acid, hexanoic acid, octanoic acid, decanoic acid, isomers of these acids, anhydrides of these acids, acid chloride derivatives of these acids and mixtures thereof. Acetic anhydride is readily obtainable and convenient to use. Similarly, aromatic acids, anhydrides and chlorides can be employed. Benzoyl chloride and substituted products of it such as 3,5-dinitrobenzoyl chloride are examples of these. Alkyl and aromatic isocyanates can also be employed. Other factors, such as solubility in the polyoxyalkylene adduct being treated and the solubility of the capped and extracted surfactant in whatever resin system is to be stabilized, are considerations of which a practitioner in the art is cognizant in selecting the capping system which will yield the desired closed cell stabilized foam. Examples of suitable capping agents are acetic acid, acetic anhydride, acetyl chloride and 3,5-dinitrobenzoyl chloride. The preferred capping agent is acetic anhydride. The capping treatment is typically performed at temperatures ranging from 50° to 140° C. and is advantageously carried out until the surfactant has a hydroxyl value of less than 50, and preferably less than 10. The hydroxyl number is determined by the ASTM-D 1638 test.

One of the preferred surfactants for use in the process of the present invention is the capped reaction product of an alkoxylated amine having the formula:

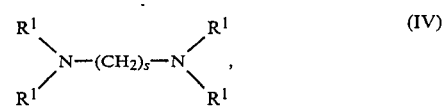

wherein $R^1$ is independently an alkoxylated chain having the formula:

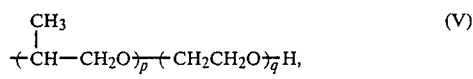

s is an integer from 2 to 10 inclusive and the ratio p:q is from 10:90 to 90:10, which amine has been reacted with a copolymerizable mixture of dialkyl maleate and a member selected from the group consisting of N-vinyl pyrrolidinone and N-vinyl caprolactam, the alkyl of the maleate having 3 to 18 carbon atoms. The preferred dialkyl maleate is dibutyl maleate.

The alkoxylation is carried out in a known manner using a mixture of ethylene oxide and propylene oxide in the molar ratio of 10:90 to 90:10 and preferably from 40:60 to 60:40. The molecular weight of the alkoxylated amine is from 1500 to 12000 and preferably from 2500 to 6000. If the molecular weight of the alkoxylated amine is less than 1500, foam collapse can occur. The viscosity of an alkoxylated amine of molecular weight higher than 6000 can prove too great for the foam system to be practical.

The preferred molar ratio of dibutyl maleate and N-vinyl-2-pyrrolidinone to be reacted with the above alkoxylated amine of formula IV is 1:1, the mixture of dibutyl maleate and N-vinyl-2-pyrrolidinone comprising between 5 and 40 weight percent of the reaction mixture, and preferably 20 weight percent of the reaction mixture. N-vinyl-2-pyrrolidinone and N-vinyl caprolactam are interchangeable in equivalent quantities, but N-vinyl-2-pyrrolidinone is preferred. The alkoxylated amine/dibutyl maleate/N-vinyl-2-pyrrolidinone reaction product is capped by reacting it with acetic anhydride.

Instead of employing branched polyols, such as the alkoxylated amine of formula IV above, as the polyoxyalkylene adduct of the invention, linear polyols may advantageously be used. Examples of such adducts are the linear polyols based on propanediols, supplied under the name "Pluronics" by BASF Wyandotte Corporation. Pluronic polyols are block copolymers of ethylene oxide and propylene oxide. One type of Pluronic consists of a central block of propylene oxide units with ethylene oxide blocks on each end. For any particular polyol series of this type, propylene oxide is added to 1,2-propanediol to attain a desired chain length and then various levels of ethylene oxide are added to achieve the desired ethylene oxide: propylene oxide ratio. Another type of Pluronic is the Pluronic R series of polyols wherein ethylene oxide is first polymerized onto 1,3-propanediol, followed by the polymerization of propylene oxide onto the resulting ethoxylated structure. The alkoxylation of the Pluronics is carried out in a known manner. Phenolic foams of excellent quality can be made by employing purified surfactants from Pluronics having high molecular weights of 2000 or more and ethylene oxide contents of 30 weight percent or above, particularly within the range of from 30 to 80 weight percent. No upper limit in the polyol molecular weight has been observed for the Pluronics in the present invention.

The present invention resides in the discovery that the above-described copolymerization reaction product comprises a mixture of components, of which the major component, after its isolation from the rest of the mixture, performs as a superior cell stabilizing surfactant in phenolic foams. By cell stabilizing surfactant is meant one which keeps a foam from collapsing and rupturing. Analysis of the copolymerization reaction product (described in detail below) reveals that its major component comprises a product formed from the reaction of the cyclic nitrogenous vinyl monomer and unsaturated diester onto the polyoxyalkylene adduct. Although the structure of this major component appears to be that of a grafted copolymer, other structures or compositions are possible. Isolation of this improved surfactant from the reaction mixture can be accomplished utilizing various conventional separation techniques such as fractional precipitation, selective extraction, and selective precipitation. Chromatography and ultracentrifugation can also be very useful.

One such separation method consists in a solvent extraction of the minor component from the bulk of the product mixture. The copolymerization reaction product is mixed with a solvent for said minor component, the mixture preferably being heated, and the solvent layer obtained is thereafter separated from the resultant insoluble residue, as by decantation of the solvent layer after settling of the mixture. Typically, the concentration of the copolymerization reaction product in the solvent washing medium is from 5% to 25% by weight. The insoluble residue, after removal of small amounts of solvent (e.g., by evaporation), yields a purified surfactant having exceptional phenolic foam stabilizing properties. The solvent washing can be performed in a single step or can be repeated until little or no soluble material is extracted from the insoluble residue, with each solvent treatment typically lasting less than an hour.

Any solvent can be employed in the solvent extraction of the present invention which will selectively dissolve away all components of the copolymerization reaction product except for its major component which is the superior phenolic foam stabilizing surfactant of the invention. A slight solubility of the major component in the extracting solvent does not seriously impair the overall process. While the principal focus of the present application is on the isolation of said major product component and its utilization as a cellular foam stabilizer, it is of course understood that in practice the remaining components (discussed below) would also be subsequently utilized, as, e.g., in other cellular foams.

A preferred class of solvents are low-boiling point liquids, such as hydrocarbons, halogenated hydrocarbons, or mixtures thereof. Suitable low-boiling liquids are those having boiling points in the range of about 35° to 80° C. The solvent extraction is conveniently carried out at the boiling point of the solvent. Examples of solvents which can be used are hexane, n-butyl chloride, pentane, mixed hexanes, heptane, cyclohexane, etc.

After its isolation from the raw copolymerization reaction product and subsequent drying to remove solvent, the purified surfactant of the invention can be used as a surfactant in the production of uniform, fine-celled foams, particularly phenolic foams.

The surfactant is employed in a cell stabilizing amount in the foam-forming composition of the invention. Generally, the surfactant comprises from 0.05 to 10, and preferably comprises from 0.1 to 6, weight percent of the composition. Too little surfactant fails to stabilize the foam and too much surfactant is wasteful. Those surfactants which are branched, non-ionic, and capped are particularly good cell stabilizers.

The purified surfactant of the present invention is particularly useful in the production of a closed-cell cellular composition comprising a phenolic resin and blowing agent in addition to the surfactant. Phenolic resin foams are a well-knwon class, phenol-aldehyde resin foams being representative and proportions of blowing agent and catalyst components being well known in the art.

Foams of low friability can be obtained by using a preferred phenolic polymer described in Moss U.S. Pat. No. 3,876,620. The preferred phenolic polymer is an alkylol group containing phenolic polymer of the formula:

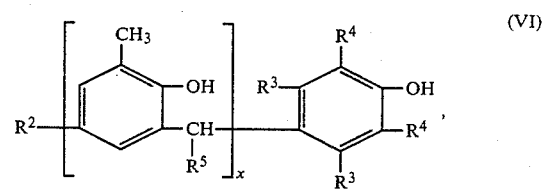

(VI)

wherein $R^2$ is

hydrogen or a radical of the formula:

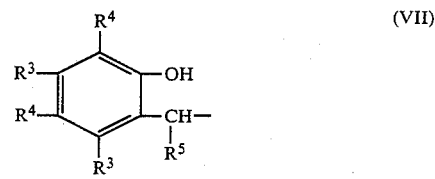

(VII)

The $R^3$'s are independently selected from the group consisting of lower alkyl, preferably of 1 to 4 carbon atoms, phenyl, benzyl, halo, preferably chloro, bromo, or fluoro, nitro, and hydrogen. The $R^4$'s are independently selected from the group consisting of

hydrogen, or a radical of above Formula VII.

The $R^5$'s are independently selected from the group consisting of lower alkyl, preferably of 1 to 4 carbon atoms, hydrogen, phenyl, benzyl, or furyl. By furyl is meant the radical introduced by the use of furfural. In above Formula VI, x is an integer from 2 to 10 inclusive and is preferably an integer from 2 to 6 inclusive. When x is less than 2, a foam produced from such a phenolic polymer tends to have too high a friability. On the other hand, as x exceeds 10, the viscosity of the polymer increases to the point where it is difficult to process the foam. The phenolic polymers of the present invention generally have a molecular weight between 200 and 2,000 and preferably have a molecular weight between 300 and 1,500. At lower molecular weights, the resultant foams tend to have too high a friability, whereas at high molecular weights the viscosity of the phenolic polymer, even when a solvent is present, tends to be too high to permit processing.

A preferred subclass of phenolic polymers are those of the formula:

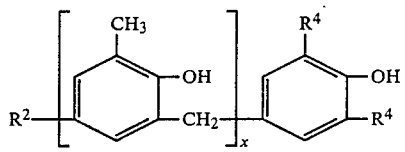 (VIII)

wherein $R^2$ is $HOCH_2$—, hydrogen or a radical of the formula:

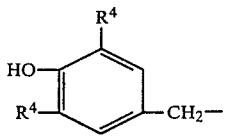 (IX)

The $R^4$'s in above Formulas VIII and IX are independently selected from the group consisting of $HOCH_2$—, hydrogen or a radical of above Formula IX.

In a preferred embodiment of the present invention, at least one of the $R^4$'s is methylol, i.e., $HOCH_2$—. This is to ensure that there will be crosslinking sites on the phenolic polymer. Of course, it is well known in the art that such methylol groups or, when the aldehyde is other than formaldehyde, alkylol groups, are automatically introduced into the polymer by the process described below.

In the broadest aspects of the present invention, the phenolic polymer can contain widely varying ratios of the radicals of Formula VII or IX to ortho-cresol units. However, this ratio is generally from 1:3 to 10:1 and is preferably from 1:1 to 4:1. At higher ratios, i.e., a deficiency of ortho-cresol, the cellular material produced from such a phenolic polymer tends to be too friable. In determining the above ratios, one must include the radicals of Formula VII or IX present in Formula VI or VIII, respectively. The phenolic polymers of the invention can be synthesized by the methods described in U.S. Pat. No. 3,876,620, the teachings of which are incorporated herein by reference.

The phenolic compositions useful in the present invention generally comprise the phenolic polymer of Formula VI or Formula VIII, together with a compound of the formula:

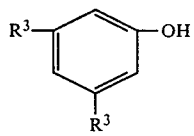 (X)

wherein the $R^3$'s are independently selected from the group consisting of lower alkyl, preferably of 1 to 4 carbon atoms, phenyl, benzyl, halo, preferably chloro, bromo, or fluoro, nitro, and hydrogen.

The compound of Formula X can be present in the phenolic composition in widely varying ratios of Compound X to the polymeric composition but is generally present in a weight ratio of 1:30 to 1:2 and is preferably present in a weight ratio of 1:20 to 1:5. Examples of suitable compounds of Formula X include among others: m-cresol, m-chlorophenol, m-nitrophenol, 3,5-xylenol, and phenol, i.e., hydroxy benzene. Phenol is the most preferred compound of Formula X because of cost, availability, and reactivity. The phenolic polymers of Formula VI and Formula VIII are produced according to the present invention by combining the reactants in a two-step process described in Moss, U.S. Pat. No. 3,876,620.

In the broadest aspects of the present invention, any aldehyde can be employed to produce useful phenolic polymers. Examples of suitable aldehydes include, among others, furfural, formaldehyde, benzaldehyde, and acetaldehyde. Formaldehyde is the preferred aldehyde. Formaldehyde can be employed in widely varying forms such as the 37% aqueous solution widely known as formalin. However, it is generally necessary to remove from the polymeric material the water introduced with the formalin. Formaldehyde is preferably employed in the form of paraformaldehyde which contains much less water.

The cellular material of the present invention is formed by simply reacting the alkylol group containing phenolic polymer of Formula VI or Formula VIII and the compound of Formula X under conditions such that a cellular product will result. As is well known in the phenolic foam art, the reaction can be conducted in the presence of a foaming catalyst, a blowing agent, and a surfactant. The reaction can be performed between temperatures of 10°–50° C., preferably 15°–25° C., and conveniently at atmospheric pressure. The cellular materials of the present invention generally have a thermal conductivity, k-factor value of from 0.1 to 0.3, and preferably from 0.1 to 0.2 Btu/hr-°F.-sq. ft. per inch as measured at 24° C. The k-factor value is measured on a Model 88 machine supplied by the ANACON Company. The friability of the cellular material is 20% or less. Friability is the propensity of the foam to break expressed in percent weight loss. This is determined by the ASTM C-421 friability test conducted for 10 minutes.

In the broadest aspects of the present invention, any catalyst which will enhance the cross-linking and foaming reaction can be employed in the present invention. However, the preferred foaming catalysts are aromatic sulfonic acids, examples of which include, among others, benzene sulfonic acid, toluene sulfonic acid, xylene sulfonic acid, and phenol sulfonic acid. Phosphoric acid can also be employed either alone or in admixture with the sulfonic acids. The preferred sulfonic acid is a mixture of equal parts by weight of toluene sulfonic acid and xylene sulfonic acid, as described in Mausner et al. U.S. Pat. No. 3,458,449. Another foaming catalyst which has been found to give excellent results is a blend of toluene sulfonic acid, phosphoric acid, and water in a weight ratio of 35–50:50–35:15.

The catalyst is generally present in the minimum amount that will give the desired cream times of 10 to 120 seconds and firm times of 40 to 600 seconds to the reacting mixture. The catalyst, however, generally comprises from 0.5 to 20, and preferably comprises from 1.0 to 15, weight percent, based on the weight of the cellular material.

Any blowing agent characteristically employed in similar prior art products, such as is described in Moss et al., U.S. Pat. No. 3,968,300, can be employed in the composition of the present invention. In general, these blowing agents are liquids having an atmospheric pressure boiling point between minus 50 and 100° C. and preferably between zero and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Combinations of trichlorofluoromethane plus 1,1,2-trichloro-, 1,2,2-trifluoroethane, are the preferred blowing agents. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

The cellular phenolic product formed by using the purified surfactant of the invention has a uniform, fine-celled structure. Uniformity of cells is determined by visual and microscopic examination. This property of producing a fine-celled foam is tested by mixing 2 to 5% of the surfactant with the phenolic composition and producing a foam as described herein.

The average cell size diameter should ideally be less than 0.2 mm and is more preferably less than 0.1 mm (ASTM D-2842). Fine-celled foams can by the means set forth in the invention be rendered closed cells. The blowing agent is then trapped in the cells. One means of expressing the containment in the cells of the blowing agent is by use of the k-factor drift value. Unfaced cellular materials containing fluorocarbon gas have initial k-factors in the vicinity of 0.1–0.2 at 24° C. This low value increases over a period of months or sometimes days. The change is expressed as the k-factor drift. The k-factor is measured at a mean temperature of 24° C. The value is determined at various time intervals up to about 1000 days. A material exhibiting fast k-drift will attain a k-factor (BTU/hr-°F.-ft$^2$ per inch thickness) of at least 0.2 within 25 days. A slow k-drift material may require between 200 days and over two years to attain a 0.2 value. Any material which possesses a k-value under 0.2 will provide high thermal resistance. Obviously, the longer this value or a lower value is maintained, the better the efficiency of the insulation.

Ball, Hurd and Walker have published a comprehensive discussion of k-factor changes as a function of time. ("The Thermal Conductivity of Rigid Urethane Foams", J. Cellular Plastics, March/April, 1970, pp 66–78). F. Norton ("Thermal Conductivity and Life of Polymer Foams", J. Cellular Plastics, January, 1967, pp 23–37) has shown that diffusion of fluorocarbon gases out of unfaced foam and infusion of air into the foam causes an increase in k-factor. A slow k-drift foam is defined as one that attains a k-factor at 24° C. of 0.15–0.17 after 200–400 days and then remains below 0.2 k-factor for 5–10 years. Eventually all fluorocarbon diffuses from the foam to leave a closed cell material which contains only air in the cells.

The k-factor for the closed cell foam containing only air falls in the range of 0.22–0.26 BTU/hr-°F.-ft$^2$ per inch thickness at 24° C. for the 2–3 lbs/ft$^3$ density range.

Therefore, if a foam exhibits greater than 0.2 k-factor after a short period of time less than 25 days, then substantially all fluorocarbon has diffused from the foam and has been replaced by air. On the other hand, if the k-factor remains below 0.2 for at least 100 days, then a substantial amount of fluorocarbon gas remains in the closed cells of the foam in spite of infusion of air.

It has been found that use of the purified surfactant of the invention results in fine-celled foams with high closed cell content, a low initial k-factor and a low k-drift value.

The portion of the material removed to yield the purified surfactant consists substantially of a copolymer of the cyclic nitrogenous vinyl monomer and the esterified, unsaturated dibasic acid. This isolated material can be utilized as a cell stabilizing surfactant in isocyanurate-containing foams and urethane foams. An example showing how it can be used in isocyanurate foams is found in DeLeon U.S. Pat. No. 3,940,517, which patent is incorporated herein by reference. Direct substitution of the isolated copolymer for the siloxane surfactant (DC-193) in example V of U.S. Pat. No. 3,940,517 results in formation of an isocyanurate foam with properties equivalent to those of the siloxane-stabilized foam.

Referring now to the drawings, and in particular to FIG. I, there is shown a laminated building panel 10 of the present invention. The building panel 20 comprises a single facing sheet 11 having thereon a cellular material 12 of the present invention. FIG. II shows a building panel 20 having two facing sheets 21 and 22 on either side of a cellular material 23.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the preparation of a surfactant precursor in accordance with the present invention.

400 g (0.07 mole) of ethoxylated propoxylated ethylene diamine (Tetronic 704) was placed in a 1 liter resin kettle, said kettle being equipped with an overhead stirrer, and heated to 90° C. A mixture of 68 g (0.29 mole) of dibutyl maleate (DBM), 1 g (0.005 mole) of t-butyl perbenzoate (TBP) and 2 g (0.012 mole) of azobisisobutyronitrile (AIBN) was added slowly over two hours to the polyol from an addition funnel. At the same time, 32 g (0.29 mole) of N-vinyl-2-pyrrolidinone (NVP) was slowly added from a second addition funnel. The reaction was performed in a nitrogen atmosphere. After the addition, the mixture was heated to 140° C. for one hour and then allowed to cool to room temperature. Acetic anhydride (35 g, 0.35 mole) was next added dropwise over 20 minutes to the reaction mixture from an addition funnel. The mixture was heated to 100° C. for two hours and then allowed to cool to room temperature to produce a surfactant precursor (The acetic anhydride caps the hydroxyl end groups on the polyol with acetate groups):

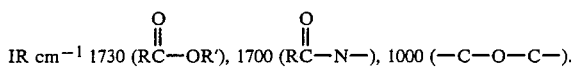
IR cm$^{-1}$ 1730 (RC—OR'), 1700 (RC—N—), 1000 (—C—O—C—).

Anal. calcd. for $C_{357}H_{687}O_{138}N_6$: C, 58.98; H, 9.43; N, 1.26. Found: C, 59.01; H, 9.34; N, 1.09.

The above alkoxylated diamine used in the preparation of the surfactant precursor has a molecular weight of 5500, has a weight ratio of ethylene oxide to propylene oxide of 40:60, and is available from the BASF Wyandotte Corporation, Wyandotte, Mich., U.S.A., under the tradename "TETRONIC 704."

EXAMPLE 2

A study was undertaken to determine the makeup of the surfactant precursor prepared in Example 1. One goal of this study was to analyze the precursor for the presence of the copolymer of N-vinyl-2-pyrrolidinone and dibutyl maleate. As an initial step, this copolymer was prepared as follows:

Preparation of Poly(N-vinyl-2-pyrrolidinone-dibutyl maleate)

N-vinyl-2-pyrrolidinone (32 g, 0.29 mole) and dibutyl maleate (68 g, 0.29 mole) were dissolved in 400 ml of xylene in a reaction vessel and the temperature was increased to 90° C. t-Butyl perbenzoate (1 g, 0.005 mole) and azobisisobutyronitrile (2 g, 0.012 mole) were added slowly to the xylene solution over two hours. The reaction was carried out in a nitrogen atmosphere. The temperature was increased to 140° C. for one hour and then the reaction was allowed to cool to room temperature. The xylene was evaporated in a vacuum, leaving a reddish orange oil residue. This oil was purified by dissolving it in boiling heptane, from which it separated upon cooling as a viscous, orange liquid:

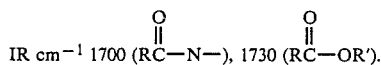
IR cm$^{-1}$ 1700 (RC—N—), 1730 (RC—OR').

Anal. calcd. for $C_{18}H_{29}O_5N$: C, 63.69; H, 8.61; H, 4.12. Found: C, 63.64; H, 8.59; N, 4.25. Residual N-vinyl-2-pyrrolidinone, as measured by gas/liquid chromatography (GLC), was 1.0±0.1%.

EXAMPLE 3

This example illustrates the purification of the surfactant precursor by solvent extraction in accordance with the present invention.

A. Batch Method

A 50 g or 100 g sample of the surfactant precursor of Example 1 was placed into a 1 liter Erlenmeyer flask. Approximately 800 ml of hexane was added and the mixture was boiled, while being stirred, for 30 minutes. The mixture was allowed to stand at room temperature for 10 minutes and the hexane was decanted from the insoluble residue. The hexane was evaporated in a vacuum, yielding an extracted material. The process was repeated until little or no soluble material was extracted from the original sample, leaving the purified surfactant residue of the invention.

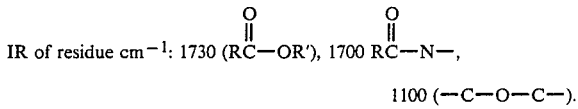
IR of residue cm$^{-1}$: 1730 (RC—OR'), 1700 RC—N—, 1100 (—C—O—C—).

Anal. Found: C, 58.89; H, 9.63; N, 0.92.

Depending upon the number of extractions, the amount of material removed from the purified surfactant of the invention varied between about 20 and 30 weight %. Approximately 20% of the soluble material was isolated after three extractions in the Erlenmeyer flask. The results of the extractions appear in Table I. The amount of soluble material increased to the maximum value of about 30% when the number of extractions was increased to six or more (See Table I, Run No. 2). The remaining 70% was not appreciably soluble in boiling hexane.

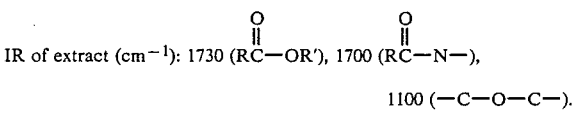
IR of extract (cm$^{-1}$): 1730 (RC—OR'), 1700 (RC—N—), 1100 (—C—O—C—).

Anal. Found: C, 62.55; H, 9.14; N, 2.83.

The IR and elemental analysis results for the extract and residue indicate that the residue consists of more polyol than the extract and that the extract consists of more poly(N-vinyl-2-pyrrolidinone-dibutyl maleate) than the residue.

B. Continuous Liquid-Liquid Method

Another extraction method, continuous liquid-liquid was carried out to achieve a more quantitative separation of the components. In comparison to the 19–23% of material extracted in the batch method (employing 3 extractions), the amount extracted in a conventional liquid-liquid extraction apparatus varied between 18 and 26% over an extraction time of 24 hours. In one experiment, the continuous method was operated for 72 hours and 31% soluble material was removed. (See Table I, Run No. 3). Under the experimental conditions employed, the 24-hour continuous method was not as accurate as the 3-batch method.

TABLE I

| | EXTRACTION RESULTS | |
|---|---|---|
| Run No. | Number of Extractions | Weight Percent Extracted |
| 1 | 3 | 19–23 |
| 2 | 6 | 28–30 |
| 3 | Continuous (3 days) | 31 |

EXAMPLE 4

This example illustrates the utilization of the solvent extraction method of the invention in elucidating the structure of the purified surfactants of the present invention. In this study, hexane was used as the solvent and the extraction was carried out in accordance with the batch method (3 extractions) described in Example 3A. This hexane extraction batch method was performed on two control samples: (1) a mixture of Tetronic 704 and the copolymer poly(N-vinyl-2-pyrrolidinone-dibutyl maleate), and (2) a mixture of Tetronic 704, the copolymer poly(N-vinyl-2-pyrrolidinone-dibutyl maleate), N-vinyl-2-pyrrolidinone (NVP) and dibutyl maleate (DBM).

Control sample 1 was prepared by mixing 10 g of the copolymer of Example 2 with 40 g of Tetronic 704. This composition simulated a surfactant preparation in which no copolymerization of the monomers to the polyol occurred and the comonomers formed a copolymer. Extraction yielded 20% soluble material which contained, according to IR, copolymer and a small amount of polyol. The IR of the residue showed only polyol.

Control sample 2 was prepared by mixing 80 g of Tetronic 704 with 7.5 g of DBM, 3.5 g of NVP and 9 g of the copolymer of Example 2. This composition simulated a surfactant preparation in which no copolymerization of monomers to the polyol occurred and 50% of the comonomers formed a copolymer. Upon extraction, approximately 24% of the sample dissolved in hexane. The IR of the soluble fraction showed copolymer, comonomers and a small percentage of polyol. The IR of the residue indicated that it consisted of polyol only.

In another test, control sample 2 was first heated to 90° C. for two hours. Extraction yielded 24% soluble material. The IR spectra of both fractions were identical to the IR of the unheated samples from control sample 2.

The extraction results are tabulated in Table II.

The above control experiments demonstrate that poly N-vinyl-2-pyrrolidinone-dibutyl maleate) can be completely extracted from the polyol by means of the solvent extraction method with hexane. This proves that the reacted NVP and DBM contained in the insoluble residue of Example 3 are not present as a copolymer and implies that these monomers are probably grafted to the polyol by copolymerization.

TABLE II
EXTRACTION RESULTS

| Control Sample | Composition Treated (%) | | | | Extraction | |
|---|---|---|---|---|---|---|
| | Tetronic 704 | Copolymer | DBM | NVP | Number of Extractions | Weight Percent Extracted |
| 1 | 80 | 20 | — | — | 3 | 20 |
| 2 | 80 | 9 | 7.5 | 3.5 | 3 | 24 |
| 2 (heated at 90° C. for 2 hours) | 80 | 9 | 7.5 | 3.5 | 3 | 24 |

EXAMPLE 5

This example illustrates the synthesis of a phenolic polymer of Formula VIII useful in the present invention employing a molar ratio of phenol to o-cresol of 2:1.

| Item | Ingredient | Amount grams | moles |
|---|---|---|---|
| A | o-cresol | 10,580 | 98 |
| B | paraformaldehyde (93.6%) | 4,743 | 148 |
| C | sodium hydroxide (50%) | 295 | 3.69 |
| D | phenol | 18,428 | 196 |
| E | paraformaldehyde | 7,917 | 247 |
| F | glacial acetic acid | 225 | 3.75 |

Items A and B are charged to a reaction vessel. Item C is added over a period of fifteen minutes, the temperature rises to 100° C. due to an exothermic reaction and is maintained at that level for 1.5 hours. Items D and E are then added and the temperature maintained at 80° C. for four and one-half hours. Item F is then added and the contents of the reaction are termed Resin B.

Resin B has a viscosity at 25° C. of 16,500 cps, a free phenol content of 9%, and a free water content of 8.5%, a free formaldehyde content of 0.5%, and a free o-cresol content of less than 0.1%.

EXAMPLE 6

This example illustrates the synthesis of a phenolic polymer of Formula VIII useful in the present invention employing a molar ratio of phenol to ortho cresol of 4:1.

The following quantities of the following ingredients are combined as indicated.

| Item | Ingredient | Amount grams | moles |
|---|---|---|---|
| A | o-cresol | 6,901 | 63.9 |
| B | paraformaldehyde (93.5% HCHO) | 3,133 | 97.7 |
| C | sodium hydroxide (50% NaOH) | 215 | 2.69 |
| D | phenol | 24,025 | 255.5 |
| E | paraformaldehyde | 11,350 | 354.1 |
| F | sodium hydroxide (50% NaOH) | 215 | 2.69 |
| G | glacial acetic acid | 350 | 5.8 |

Items A and B are charged to a reaction vessel. Item C is added over a period of fifteen minutes, the temperature rises due to the exothermic reaction, to 100° C. and is maintained at that level for 1.5 hours. Items D, E, and F are then added and the temperature maintained at 80° C. for 5 hours. Item G is then added and the contents of the reaction vessel are termed Resin C.

Resin C has a viscosity at 25° C. of 47,000 cps, a free phenol content of 8%, and a free water content of 9%, a free formaldehyde content of 0.5%, and a free o-cresol content of less than 0.1%.

EXAMPLE 7

This example illustrates the synthesis of foaming catalysts useful in the present invention.

The following quantities of the following ingredients are combined as indicated to produce Catalyst A:

| Ingredients | | Quantity |
|---|---|---|
| Item | Name | grams |
| A | p-toluene sulfonic acid | 333 |
| B | xylene sulfonic acids | 333 |
| C | water | 333 |

Items A, B, and C are mixed. The resultant composition is termed Catalyst A.

The following quantities of the following ingredients are combined as indicated to produce Catalyst B:

| Ingredients | | Quantity |
|---|---|---|
| Item | Name | grams |
| A | Ultra TX | 667 |
| B | water | 333 |

Items A and B are mixed. The resultant composition is termed Catalyst B. Ultra TX is a mixture of equal parts by weight of p-toluene sulfonic acid and xylene sulfonic acids available from the Witco Chemical Company.

EXAMPLE 8

This example illustrates the synthesis of phenolic foams based on 2:1 phenol:o-cresol resoles utilizing as surfactant the various materials set forth in the following Paragraphs A—C. In each foam synthesis, the following quantities of the following ingredients are combined as indicated:

| Item | Ingredient | grams |
|---|---|---|
| A | Resin B of Example 5 | 300 |
| B | $CFCl_3$ | 22.5 |
| C | $CCl_2FCF_2Cl$ | 22.5 |
| D | Surfactant (See below) | |
| E | Catalyst B of Example 7 (See below) | |

Items A through E are mixed at 15° C. in an open vessel for 15 seconds. The mixture is then poured into a square paper box twelve inches by twelve inches by five inches tall. A foaming reaction ensues. After a period of about 240–300 seconds the material is rigid. The box and contents are placed in an oven at 55° to 75° C. for a period of ten minutes to one hour.

A. Unpurified Precursor and Purified Residue as Surfactants

The characteristics of the foams synthesized utilizing as surfactant the surfactant precursor of Example 1 and the purified surfactant of the invention are shown in Table III. The type and amount of the surfactants and catalyst employed in the foam synthesis are also presented in Table III.

The Table III results show that the purified surfactant works as well as the unpurified surfactant precursor in 2:1 phenol:cresol foams. The k-factors, the k-factor drift rates and the friabilities of the foams were very similar. The foams made with 3, 4, and 5 phr of either surfactant had low k-factors and low drift rates.

B. Poly(N-vinyl-2-pyrrolidinone-dibutyl maleate), Tetronic 704 and Mixtures Thereof as Surfactants Attempts were made to synthesize phenolic foams by using the copolymer of Example 2, Tetronic 704 and mixtures of the two as the foam surfactant. Foams based on 2:1 phenol:o-cresol resoles were prepared according to the procedure of Example 8A, the surfactant and catalyst being used in the amounts of 15 g and 40 g, respectively, per 300 g of Resin B in each case. The foam evaluations* are presented in Table IV.

As shown in the table, Foam No. 1 collapsed, the copolymer being incapable of stabilizing the phenolic foam. Similarly, when various mixtures of the copolymer with Tetronic 704 were utilized, the resulting foams either collapsed or were very coarse celled. The results suggest that the surfactant precursor of Example 1, which is shown to possess foam stabilizing properties in Example 8A, cannot be a simple mixture of polyol and copolymer exclusively. The results instead suggest the presence of a third component in the precursor that can effectively stabilize phenolic foams. As indicated in Example 8, this component is most likely the grafted copolymer.

TABLE IV

COPOLYMER/TETRONIC 704 BLEND IN RESIN B FOAMS

| Foam No. | Copolymer: Tetronic 704 (Wt. Ratio) | Foam Characteristics |
|---|---|---|
| 1 | 100:0 | Collapse |
| 2 | 20:80 | Very coarse cells |
| 3 | 40:60 | Very coarse cells |

TABLE III

FOAM EVALUATION OF SURFACTANTS

| Foam No. | SURFACTANT Type | SURFACTANT Wt./300 g Resin B | CATALYST Wt./300 g Resin B | REACTIVITY Cream Time, Sec. | REACTIVITY Firm Time, Min. | FOAM Den., PCF | FOAM Fri., % wt. loss/ 10 min. | k-Factor Days 1 | 7 | 14 | 30 | 60 |
|---|---|---|---|---|---|---|---|---|---|---|---|---|
| 1 | Surfactant Precursor of Example 1 | 9 | 40 | 150–180 | 9 | — | — | .125 .131 | .120 .118 | .121 .121 | .120 .123 | .116 .129 |
| 2 | Surfactant Precursor of Example 1 | " | " | 130–140 | 7 | 2.12 | 16 | .134 | | | | |
| 3 | Surfactant Precursor of Example 1 | 12 | " | 150–180 | 9.5 | 2.5 | 11 | .125 .130 | .117 .120 | .119 .122 | .121 .115 | .127 .130 |
| 4 | Surfactant Precursor of Example 1 | 15 | " | 180 | 10 | 2.8 | 10 | .126 .130 | .125 .135 | .125 .136 | .125 .138 | .129 .148 |
| 5 | Purified Surfactant of Example 3A residue after 3 extractions) | 9 | " | 180 | 8.75 | 2.5 | 11 | .127 .137 | .125 .127 | .123 .125 | .126 .128 | .128 .132 |
| 6 | Purified Surfactant of Example 3A (residue after 3 extractions) | 12 | " | 180 | 9.5 | 2.7 | 9 | .125 .125 | .121 .133 | .118 .132 | .124 .134 | .129 .146 |
| 7 | Purified Surfactant of Example 3A (residue after 3 extractions) | 15 | " | 180 | 10 | 1.6 | 9 | .125 .131 | .125 .126 | .123 .125 | .125 .126 | .131 .134 |

TABLE IV-continued

COPOLYMER/TETRONIC 704 BLEND IN RESIN B FOAMS

| Foam No. | Copolymer: Tetronic 704 (Wt. Ratio) | Foam Characteristics |
|---|---|---|
| 4 | 10:90 | Very coarse cells |
| 5 | 5:95 | Coarse cells |
| 6 | 0:100 | Collapse |

*The cell quality of the foams was determined by visual and microscopic examination.

C. Extract as Surfactant

The evaluation procedure of Example 8A was repeated except that an extract from the 3 batch extraction method of Example 3A was used as the foam surfactant. This material did not stabilize the phenolic foam on its own (foam collapsed) or when a mixture of 20 weight percent of it and 80 weight percent of Tetronic 704 was used (coarse celled foam resulted). The evaluation procedure of Examples 8A was again carried out using as surfactant the final 5-8% extract fraction of a total 30 weight percent extraction performed according to the batch technique of Example 3A. This material produced slightly coarse celled foam in the 2:1 phenol:o-cresol based system. The 5-8% soluble fraction is probably composed of more grafted copolymer than the other 22-25%.

The above extract evaluations were carried out using 15 g of surfactant and 40 of catalyst per 300 g of Resin B in each case.

The results tend to show that the extract may contain a large amount of copolymer, along with smaller amounts of unreacted Tetronic 704, comonomers and grafted copolymer.

EXAMPLE 9

This example illustrates the synthesis of phenolic foams based on 4:1 phenol:o-cresol resoles utilizing as surfactant the surfactant precursor of Example 1 and the purified surfactant of the invention. In each foam synthesis, the following quantities of the following ingredients are combined as indicated:

| Item | Ingredient | grams |
|---|---|---|
| A | Resin C of Example 6 | 300 |
| B | $CFCl_3$ | 22.5 |
| C | $CFCl_2CF_2Cl$ | 22.5 |
| D | Surfactant (See Table V) | |
| E | Catalyst B of Example 7 | 35 |

Items A through E are mixed at 15° C. in an open vessel for 15–20 seconds. The mixture is then poured into a square paper box twelve inches by twelve inches by five inches tall. A foaming reaction ensues. After a period of 300–400 seconds the material is rigid. The box and contents are placed in an oven at 55° to 75° C. for a period of ten minutes to one hour.

The characteristics of the resultant foams are shown in Table V. The type and amount of the surfactants employed in the foam syntheses are also presented in Table V.

TABLE V

FOAM EVALUATION OF SURFACTANTS

| Foam No. | SURFACTANT Type | SURFACTANT Wt./300 g Resin B | REACTIVITY Cream Time, Sec. | REACTIVITY Firm Time, Min. | FOAM Den., PCF | FOAM Fri., % wt. loss/ 10 min. | FOAM k-Factor Days 1 | 7 | 14 | 30 | 60 |
|---|---|---|---|---|---|---|---|---|---|---|---|
| 1 | Surfactant Precursor of Example 1 | 9 | 100 | 7 | 1.9 | 60 | .137 .155 .160 | .137 .235 | .142 | .143 | .147 |
| 2 | Surfactant Precursor of Example 1 | 12 | 100 | 8 | 2.4 | 49 | .136 .140 | .141 .148 | .143 .147 | .151 .163 | |
| 3 | Surfactant Precursor of Example 1 | 15 | 120 | 9.5 | 2.7 | 52 | .134 .140 | .135 .136 | .137 .140 | .136 .137 | .137 .144 |
| 4 | Purified Surfactant of Example 3A (residue after 3 extractions) | 9 | 100 | 8 | 1.9 | 16 | .131 .206 | .199 .221 | | | |
| 5 | Purified Surfactant of Example 3A (residue after 3 extractions) | 15 | 120 | 9.5 | 2.1 | 17 | .124 .120 | .134 .136 | .142 .146 | .147 .159 | .167 .181 |

The Table V results show that, in comparison to the unpurified surfactant precursor, the purified surfactant displayed a significant improvement in its ability to stabilize 4:1 phenol:cresol foams. Although k-factor and drift rates were similar, the foams made with the purified surfactant exhibited lower friabilities. Friabilities dropped from 49–60% to 16–17% in 4:1 phenol:cresol foams.

EXAMPLE 10

This example illustrates the synthesis of a foaming catalytic composition useful in the present invention.

The following quantities of the following ingredients are combined as indicated:

| Item | Ingredient | Quantity Grams | Quantity Gram-moles |
|---|---|---|---|
| A | 2-ethyl-hexanoic acid | 15.2 | 0.104 |
| B | polyoxyethylene glycol | 80.9 | 0.809 |
| C | KOH | 5.8 | 0.104 |

Items A and B are mixed, whereupon Item C is added until the resultant mixture has a pH of 7.0 as determined by a test with red litmus paper. The water of reaction is removed by contacting the reaction mixture with a molecular sieve supplied by the Union Carbide Corporation as Linde 3A.

Item B is the polyoxyethylene glycol supplied by the Union Carbide Corporation under the tradename Carbowax 200 and is the ethylene oxide adduct of ethylene glycol having an average molecular weight of 200; specific grafity 1.27±0.002 at 20° C.; refractive index 1.459±0.003 at 25° C. and hydroxyl number of 560.

The resultant product is termed catalytic composition C.

| Item | Ingredient | Quantity Grams |
|---|---|---|
| | (See Table VI for amount) | |

*The polymethylene polyphenyl isocyanate used was supplied by the Mobay Chemical Company under the tradename MONDUR MR 200.

Items A and B are mixed with each other in a reaction vessel at 15° C. To this mixture item D and next item C are added. After the mixture is stirred for a short time, item E is added, whereupon the mixture cures to a polyisocyanurate foam. The characteristics of the foams synthesized utilizing various surfactant and catalyst combinations are shown in Table VI.

TABLE VI

POLYISOCYANURATE FOAMS

| Foam No. | SURFACTANT Type | SURFACTANT wt. (g) | WT. CATALYST (g) | FOAM Friability, % wt. loss/10 min. | FOAM Den. (pcf) | k-Factor Days 1 | k-Factor Days 7 | k-Factor Days 14 | k-Factor Days 28 |
|---|---|---|---|---|---|---|---|---|---|
| 1 | L-5430* | 6 | 18 | 27 | 1.9 | .119 | .1343 | .136 | .152 |
| 2 | Surfactant Precursor of Example 1 | " | 15 | 30 | 2.0 | .140 | .148 | .154 | .164 |
| 3 | Purified Surfactant of Example 3A (residue after 3 extractions) | " | 15 | 30 | 2.0 | .138 | .143 | .153 | .163 |
| 4 | Extract of Example 3A | " | 20 | 28 | 1.8 | .138 | .140 | .149 | .155 |
| 5 | Poly(N—vinyl-2-pyrrolidinone-dibutyl maleate) | " | 12 | — | | .119 | .133 | .141 | .155 |

*L-5340 is the tradename of a polydimethylsiloxanepolyoxyalkylene block copolymer surfactant available from the Union Carbide Corporation.

EXAMPLE 11

This example illustrates the synthesis of a catalytic composition of the present invention employing an ingredient in addition to the alkali metal carboxylate of Example 10.

The following quantities of the following ingredients are combined as indicated:

| Item | Ingredient | Quantity Grams |
|---|---|---|
| A | catalytic composition C of Example 10 | 100 |
| B | 2,4,6-tris(dimethylaminomethylphenol) | 9.5 |

The resultant catalytic composition is termed Catalytic Composition D.

EXAMPLE 12

This example illustrates the desirable physical characteristics of a polyisocyanurate foam produced by utilizing the extract of the present invention as the surfactant. The following quantities of the following ingredients are combined as indicated:

| Item | Ingredient | Quantity Grams |
|---|---|---|
| A | Polymethylene Polyphenyl Isocyanate* | 277 |
| B | CFCl₃ | 55 |
| C | Diethylene Glycol | 23 |
| D | Surfactant (See Table VI) | |
| E | Catalytic Composition D of Example 11 | |

The Table VI results show that the properties of a polyisocyanurate foam prepared utilizing the extract of the present invention as surfactant are comparable to the properties of the foam made with a commercially available surfactant.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the appended claims.

I claim:

1. A laminated structural panel having at least one facing sheet and having a foam material adhering to the facing sheet wherein the foam material comprises the reaction product of:
   A. phenol-aldehyde resin foam forming reactants,
   B. a blowing agent, and
   C. a surfactant which is the major component of a free radical polymerization, said major component being obtained by the steps of:
   (1) reacting together a cyclic nitrogenous vinyl monomer and an esterified unsaturated dibasic acid by free radical polymerization in the presence of a polyoxyalkylene adduct having the formula

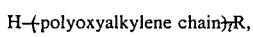
   H—(polyoxyalkylene chain)ₜR, wherein R is an organic or inorganic radical and t is the number of polyoxyalkylene chains reacted onto R, said polyoxyalkylene adduct optionally being treated either before or after said polymerization with a capping agent capable of reacting with the hydroxyl groups of said adduct to reduce the hydroxyl number of said adduct to less than 50, whereby a reaction product is obtained which can be used as a surfactant in the formation of phenolic foams, said step (1) reaction product comprising said major component and a minor component, the capacity of said major component for stabilizing phenolic foams being greater than that of said total step (1) reaction product; and (2) separating from said step (1) reaction product by any conventional method said major and minor components thereof.

2. The panel of claim 1 wherein step (2) comprises
(a) extracting said step (1) reaction product with a selective solvent, said selective solvent having a greater solubility for one of said major and minor components than for the other, to yield an extract comprising said selective solvent and the more soluble of said components and an insoluble residue comprising the other of said components; and
(b) recovering said major and minor components from said residue and extract.

3. The panel of claim 2 wherein said selective solvent has a greater solubility for said minor component.

4. The panel of claim 3 wherein the cyclic nitrogenous vinyl monomer has the formula $$H_2C=CH-N\underset{\underset{O}{\overset{\|}{C}}}{\overset{\diagup}{\diagdown}}(CH_2)_n,$$

wherein n is 3, 4, or 5, and the esterified unsaturated dibasic acid contains 4 or 5 carbon atoms in the acid portion.

5. The panel of claim 4 wherein the esterified unsaturated dibasic acid has the formula $$C_uH_{2u-2}(CO_2C_vH_{2v+1})_2,$$

wherein u is 2 or 3 and v is an integer from 3 to 18.

6. The panel of claim 5 wherein the esterified unsaturated dibasic acid is a member selected from the group consisting of dibutyl fumarate, dibutyl maleate, dihexyl fumarate, diamyl methylenemalonate, dipropyl itaconate, dibutyl itaconate, dimethylamyl maleate, diisooctyl maleate, dipentyl maleate, dihexyl maleate, dioctyl maleate, and ditridecyl maleate.

7. The panel of claim 6 wherein the cyclic nitrogenous vinyl monomer is N-vinyl-2-pyrrolidinone and the esterified unsaturated dibasic acid is dibutyl maleate.

8. The panel of claim 1 wherein t is an integer from 1 to 50 and the molecular weight of the polyoxyalkylene adduct is above about 1000.

9. The panel of claim 1 wherein the polyoxyalkylene adduct is treated either before or after the free radical addition polymerization with a capping agent capable of reacting with the hydroxyl groups of said adduct, whereby the hydroxyl number of said adduct is reduced to less than 50.

10. The panel of claim 3 wherein the selective solvent is a low-boiling point liquid selected from the group consisting of a hydrocarbon, a halogenated hydrocarbon, and mixtures thereof.

11. The panel of claim 12 wherein (a) the cyclic nitrogenous vinyl monomer is N-vinyl-2-pyrrolidinone, and
(b) the esterified unsaturated dibasic acid is dibutyl maleate.

12. The panel of claim 1 wherein the polyoxyalkylene adduct is a capped alkoxylated amine having the formula:

$$\begin{array}{c}R^1\\ \diagdown\\ R^1\end{array}N-(CH_2)_s-N\begin{array}{c}\diagup R^1\\ \\ \diagdown R^1\end{array},$$

wherein $R^1$ is independently an alkoxylated chain having the formula:

$$\underset{\underset{}{}}{(CH-CH_2O)_p}(CH_2CH_2O)_qH,$$
$$\overset{CH_3}{|}$$

s is an integer from 2 to 10 inclusive and the ratio p:q is from 10:90 to 90:10, the molecular weight of said alkoxylated amine being from about 1500 to 6000.

13. The panel of claim 12 wherein the free radical addition polymerization is conducted in the presence of a free radical initiator selected from the group consisting of peroxide and azo initiators and mixtures thereof.

14. The panel of claim 13 wherein the selective solvent is a low-boiling point liquid selected from the group consisting of a hydrocarbon, a halogenated hydrocarbon, and mixtures thereof.

15. The panel of claim 12 wherein the cyclic nitrogenous vinyl monomer and esterified unsaturated dibasic acid together comprise between about 5 and 40 weight percent of the polymerization reaction mixture of step (1).

16. The panel of claim 15 wherein the cyclic nitrogenous vinyl monomer and esterified unsaturated dibasic acid together comprise about 20 weight percent of the polymerization reaction mixture of step (1) and the molar ratio of the cyclic nitrogenous vinyl monomer to the esterified unsaturated dibasic acid is about 1:1.

17. The panel of claim 1 wherein the phenol-aldehyde resin foam forming reactants comprise
A. an alkylol group containing phenolic polymer of the formula:

(VI)

$$\left[\begin{array}{c}\overset{CH_3}{|}\\ \phantom{R^2-}\underset{\underset{R^5}{\overset{}{|}}}{\overset{}{\phantom{-}}}\\ R^2-\underset{}{\phantom{XX}}\end{array}\overset{OH}{\phantom{X}}\underset{CH}{\phantom{X}}\right]_x \quad R^3-\underset{R^3}{\phantom{X}}\overset{R^4}{\phantom{X}}\underset{R^4}{\overset{OH}{\phantom{X}}}$$

wherein:
a. $R^2$ is $$HOCH-,\\ \overset{|}{R^5}$$

hydrogen or a radical of the formula:

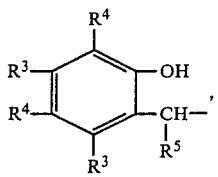 (VII)

b. the R³'s are independently selected from the group consisting of lower alkyl, phenyl, benzyl, halo, nitro, and hydrogen, c. the R⁴'s are independently selected from the group consisting of

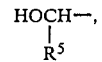

hydrogen, or a radical of above Formula VII, d. the R⁵'s are independently selected from the group consisting of lower alkyl, hydrogen, phenyl, benzyl, or furyl, e. x is an integer from 2 to 10 inclusive, f. the phenolic polymer has a molecular weight between 200 and 2,000 and B. a compound of the formula

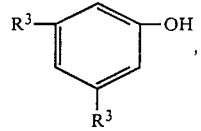 (X)

wherein the R³'s are as defined above, and the weight ratio of B:A is 1:30 to 1:2.

* * * * *